United States Patent
Mushenski et al.

(10) Patent No.: US 8,037,848 B2
(45) Date of Patent: Oct. 18, 2011

(54) ANIMAL BEHAVIORAL CONTROL APPARATUS

(75) Inventors: Christopher B. Mushenski, Mt. Clemens, MI (US); Vladislav Roytapel, Corona Del Mar, CA (US)

(73) Assignee: Canine Innovations Inc., Mount Clemens, MI (US)

( * ) Notice: Subject to any disclaimer, the term of this patent is extended or adjusted under 35 U.S.C. 154(b) by 244 days.

(21) Appl. No.: 12/416,614

(22) Filed: Apr. 1, 2009

(65) Prior Publication Data
US 2009/0250015 A1    Oct. 8, 2009

Related U.S. Application Data

(60) Provisional application No. 61/041,957, filed on Apr. 3, 2008.

(51) Int. Cl.
*A01K 15/00* (2006.01)
(52) U.S. Cl. .......... 119/719; 116/139
(58) Field of Classification Search .......... 119/712, 119/719; 116/139, 142 FP, 137 R
See application file for complete search history.

(56) References Cited

U.S. PATENT DOCUMENTS

| | | | |
|---|---|---|---|
| 2,778,330 A * | 1/1957 | Jacoby | 116/106 |
| RE24,730 E * | 10/1959 | Reeves | 116/112 |
| 3,000,344 A * | 9/1961 | Ferrell | 116/112 |
| 3,670,690 A | 6/1972 | Swanson | |
| 4,044,712 A | 8/1977 | Goodman et al. | |
| 4,166,428 A | 9/1979 | Freeman et al. | |
| 4,185,670 A | 1/1980 | Sartell, Jr. | |
| 4,227,482 A | 10/1980 | Scheindel | |
| 4,627,385 A | 12/1986 | Vinci | |
| 4,852,510 A | 8/1989 | Joseph, Jr. et al. | |
| 4,893,580 A | 1/1990 | Joseph, Jr. et al. | |
| 4,915,054 A * | 4/1990 | Vidovic et al. | 116/142 FP |
| 4,967,684 A | 11/1990 | Vidovic et al. | |
| 4,970,983 A | 11/1990 | LeBlanc et al. | |
| 5,355,830 A | 10/1994 | deJong | |
| 5,501,179 A | 3/1996 | Cory | |
| 6,615,770 B2 | 9/2003 | Patterson et al. | |
| 6,820,571 B2 | 11/2004 | Cory | |
| 7,174,856 B2 | 2/2007 | Neri | |
| 7,445,537 B2 * | 11/2008 | Langenfeld | 446/213 |

FOREIGN PATENT DOCUMENTS
WO    2005/501076 A1    6/2005

* cited by examiner

*Primary Examiner* — Rob Swiatek
*Assistant Examiner* — Kristen Hayes
(74) *Attorney, Agent, or Firm* — Reising Ethington P.C.

(57) ABSTRACT

An animal behavioral control apparatus includes a cartridge, a housing, a head, and a horn. The cartridge contains pressurized gas. The housing surrounds at least a part of the cartridge. The head is connected to the housing and includes an actuator and a valve. The valve engages the cartridge when the actuator is actuated in order to release gas out of the cartridge. The horn is removably connected to the head. When the horn is not connected to the head, the animal behavioral control apparatus ejects a blast of gas when the actuator is actuated. And when the horn is connected to the head, the animal behavioral control apparatus emits a sound when the actuator is actuated.

9 Claims, 2 Drawing Sheets

ANIMAL BEHAVIORAL CONTROL APPARATUS

FIELD OF THE DISCLOSURE

The present invention relates generally to controlling an animal, and more particularly to using an apparatus to control an animal's behavior.

BACKGROUND OF THE DISCLOSURE

A variety of techniques can be used to control an animal's behavior. For example, dog trainers ordinarily teach dogs by a repetition and reward technique to, among other things, be domesticated, obey commands, compete in shows or races, work in law enforcement, protect property, perform tricks, and guide people who are visually impaired. But sometimes it may be necessary to interupt undesirable behavior as it is occurring in order to correct it, and sometimes one technique may work on one animal and not work on another animal.

SUMMARY OF THE INVENTION

According to one embodiment, there is provided an animal behavioral control apparatus. The animal behavioral control apparatus may include a cartridge, a housing, a head, and a horn. The cartridge contains pressurized gas, and the housing may surround at least a part of the cartridge. The head may be connected to the housing and may include an actuator and a valve. The valve may engage the cartridge when the actuator is actuated in order to release gas out of the cartridge and eventually through an outlet port of the head. The horn may be removably connected to the head. When the horn is disconnected from the head, the animal behavioral control apparatus may eject a blast of gas, which may be directed at an animal. When the horn is connected to the head, the animal behavioral control apparatus may emit a sound, which may be directed at an animal.

According to another embodiment, there is provided an animal behavioral control apparatus. The animal behavioral control apparatus may include a housing, a cartridge, a head, a nozzle, an extension, an O-ring, a cap, and a horn. The cartridge contains pressurized gas and may be received at least partly within the housing. The head may extend from the housing and may include an actuator and a valve. The valve may interact with the cartridge to selectively release gas out of the cartridge. The nozzle may be connected to the head and may have an outlet port. The extension may be connected to the nozzle and may have a first end inserted into the outlet port of the nozzle. The extension may have a second end located opposite the first end, and may have a bore extending between the first end and the second end. The O-ring may be located in the extension and may have an orifice that restricts gas flow through the orifice. The cap may be inserted into the second end of the extension and may have an outlet orifice for ejecting gas through the orifice. The horn may be removably connected over the cap. When the horn is disconnected from the cap, the animal behavioral control apparatus may eject a blast of gas, which may be directed at an animal. When the horn is connected over the cap, the animal behavioral control apparatus may emit a sound, which may be directed at the animal.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
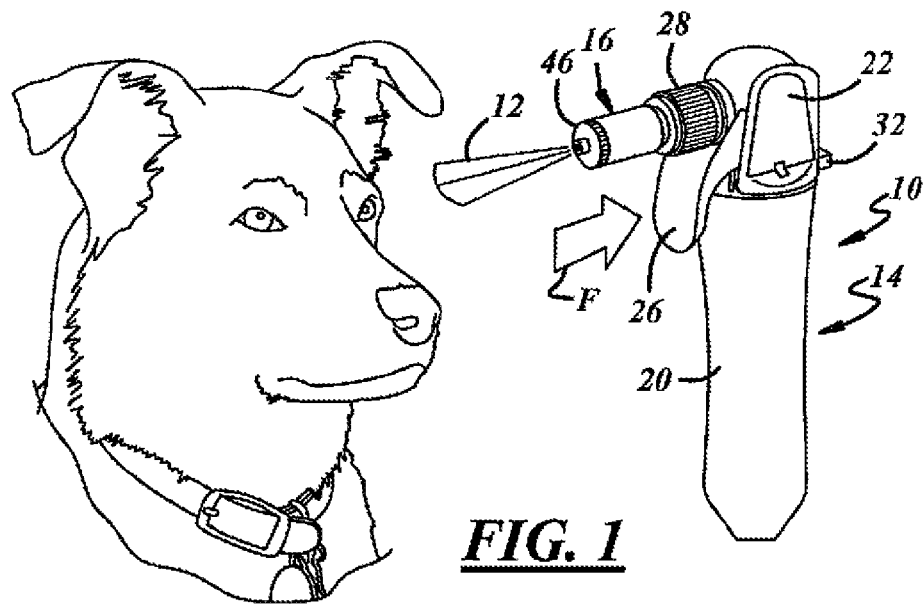
FIG. 1 is a schematic showing one exemplary embodiment of an animal behavioral control apparatus ejecting a blast of gas at an animal.
Figure 2:
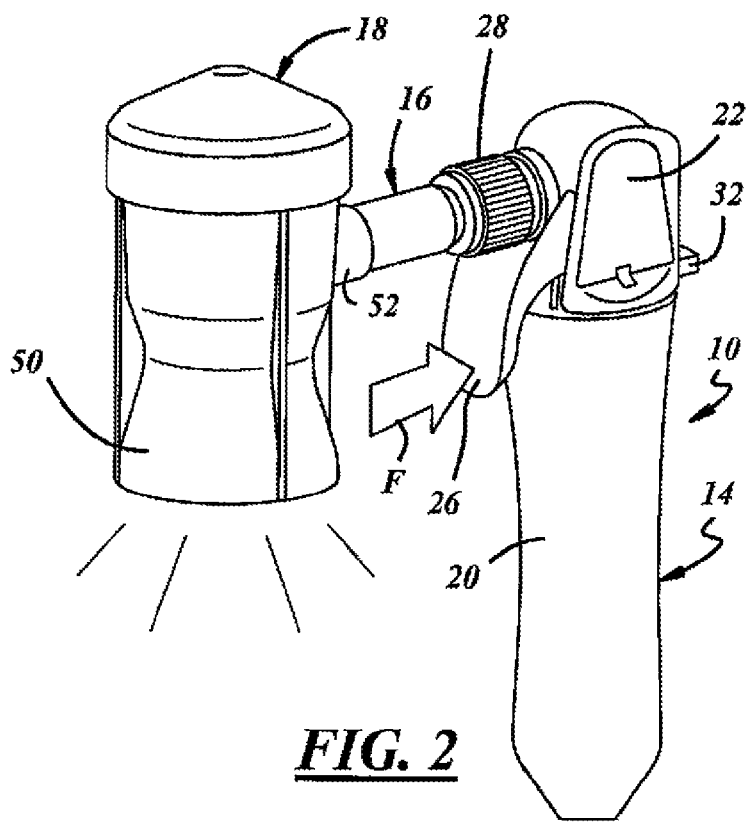
FIG. 2 is a schematic showing the animal behavioral control apparatus of FIG. 1 emitting a sound.
Figure 3:
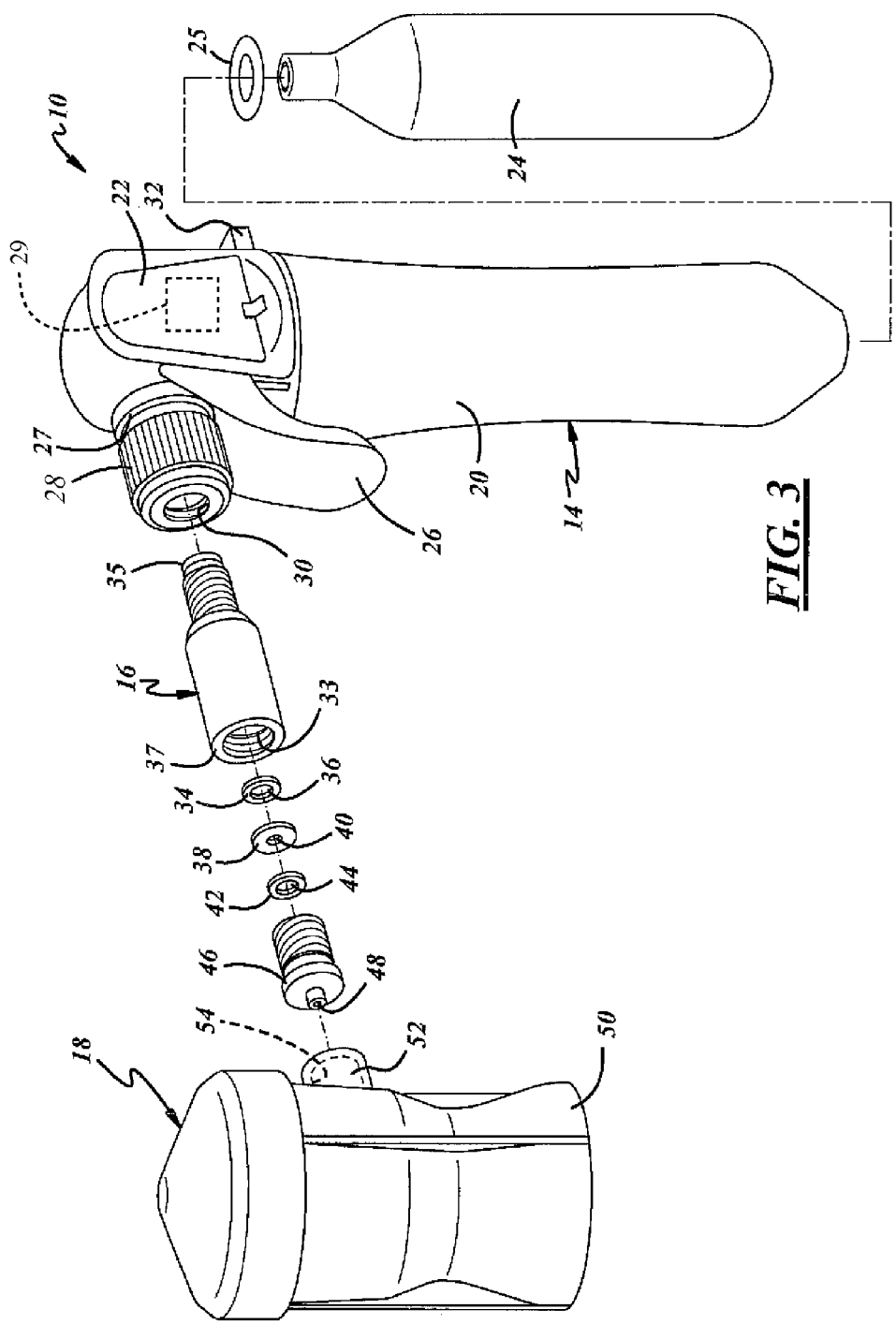
FIG. 3 is an exploded view of the animal behavioral control apparatus of FIG. 2.

Referring in more detail to the drawings, FIGS. 1-3 show an exemplary embodiment of an animal behavioral control apparatus 10 that may be used to control an animal's behavior, such as to interrupt a dog's undesirable behavior during training and other activities. The animal behavioral control apparatus 10 is a single device that can optionally, and mutually exclusively in some cases, eject a blast of gas that may be objectionable to the dog or emit a sound that may be objectionable to the dog. Though not all animals may find a particular blast of gas or sound objectionable, the blast of gas or sound may, in some cases, at least distract or be noticeable by the animal.

The animal behavioral control apparatus 10 can eject a blast or shot of gas in a somewhat controlled and directed zone 12 which, when aimed at the dog, may be disagreeable to the dog and may disrupt whatever the dog is doing at the time. Alternatively, the animal behavioral control apparatus 10 can give-off a sound that may be disagreeable to the dog and may also interfere with whatever the dog is doing at the time. Referring to FIGS. 1-3, one embodiment of the animal behavioral control apparatus 10 may include a gas discharge device 14 that ejects gas, an extension 16 connected to the gas discharge device, and a horn 18 connected to the extension.

The gas discharge device 14 ejects a blast of gas when a user actuates it. Depending on the arrangement of the animal behavioral control apparatus 10, the blast of gas may result in the zone of gas 12 or in the sound; in some cases, the blast of gas may result in both the zone of gas and the sound which may both be disagreeable to the dog. The gas discharge device 14 may be a compact hand-held device and may include a housing 20 with a head 22. The housing 20 is constructed to receive and support a pressurized gas cartridge cylinder, such as a cartridge 24. The cartridge 24 may contain pressurized gas such as $CO_2$, $N_2$, $O_2$, NO, or the like. In one example, the cartridge 24 may be a 16 gram non-threaded or threaded reservoir. In other examples, the cartridge 24 may be a 25 or 38 gram threaded reservoir, or a 40-43 gram threaded reservoir. In one embodiment, an O-ring 25 may be located between the housing 20 and the cartridge 24 to facilitate fitting between the two. The O-ring 25 may have an X-shaped cross-section and may be made of rubber. Though not shown, the housing 20 may have an open bottom with a bottom of the cartridge 24 extending below the open bottom or being generally flush with the open bottom. Still in other examples, the housing 20 need not be included at all, where only the cartridge 24 is provided and the head 22 is equipped to the cartridge.

The head 22 may be connected to the housing 20 by screwing, may be unitary with the housing, or may be connected in another way. The head 22 may have a regulator or an internal valve 29 that, when operated, releases pressurized gas held in the cartridge 24. An actuator such as a trigger 26 may be operatively connected to the internal valve whereby upon being pushed or pulled by a force F, the valve may insert a piercing pin (not shown) into the cartridge 24 which controllably releases pressurized gas from the cartridge. The head 22 may have an outlet port 27. An attachment or nozzle 28 may extend from one end of the internal valve and may be inserted in the outlet port 27. The nozzle 28 may define an outlet port 30 where the released gas is ejected out of the head 22 and out of the internal valve. In other examples, the nozzle 28 need not necessarily be provided where the extension 16 would be connected directly to the head 22. A safety switch 32 may be operatively connected to the internal valve whereby, upon pressing or pulling, prevents the trigger 26 from being pulled and thus the gas from being released. In one example, the gas discharge device 14 can be an inflator such as the Ultraflate Plus that is sold by Genuine Innovations, Inc. of Tucson, Ariz. USA.

The extension 16 may be connected by press-fitting, screwing, or another way (shown in FIG. 3 with outer threads) into the nozzle 28 to, among other things, control the ejected gas and serve as a fitting for the horn 18. In one example, the extension 16 may be made of metal and may have a length of about 1.0 inches. In another example, the extension 16 may have a length of about 1.5 inches. The extension 16 may define a bore 33 that extends from a first end 35 to a second end 37. In one example, the bore 33 may have a diameter of about $5/16$ inch; of course other lengths and diameters are possible. In the embodiment shown, one or more O-rings and plates may be located and held in the bore 33 and spaced-apart with respect to each other. The one or more O-rings and plates may have different axial lengths, and may define orifices of different diameters. The different orifices may, among other things, restrict or choke gas flow, force the flowing gas to converge therein, and change the velocity and pressure of the gas flow thereat. In some embodiments, the extension 16 need not be provided.

For example, a first O-ring 34 may be made of rubber or cork and may define a first orifice 36 located therein. The first O-ring 34 may provide a seal between its periphery and the inner surface of the bore 33. In one embodiment, the first O-ring 34 may be the only O-ring located in the extension 16, and may be positioned between about $1/4$-$1/2$ inch measured from the second end 37. A plate 38 may be composed of rubber or cork and may define a second orifice 40 therein having a diameter in a range of about $28/1000$ inch to $30/1000$ inch. And a second O-ring 42 may be composed of rubber or cork and may define a third orifice 44 having a diameter that may be greater than the second orifice 40. The first orifice 36 may also have a diameter that may be greater than the second orifice 40. The second O-ring 42 may provide a seal between its periphery and the inner surface of the bore 33. The O-rings 34, 42 may also serve as spacers.

A cap 46 may, though need not, be located at one end of the extension 16 and may define an outlet 48 through which the ejected gas can travel and which may form directed zone 12. In one example, the outlet 48 may have a diameter in a range of about $33/1000$ inch to $77/1000$ inch, and may be about 0.029 inches to 0.031 inches. The cap 46 may be threaded to screw into the extension 16, or otherwise connected to the extension. The exact size of each of the orifices including the first orifice 36, the second orifice 40, the third orifice 44, and the outlet 48 may depend on, among other things, the desired number of individual blasts of gas and the desired intensity of the emitted sound. In other embodiments, the extension 16 may not have the O-rings or the plate, and instead may have a body that itself defines a single bore with varying diameters and with a unitary cap. And in yet other embodiments, the extension 16 may simply not have the O-rings or plate, and may only have the cap 46.

The horn 18 may be removably and optionally press-fit over the second end 37 of the extension 16, and may be used to radiate the resulting sound waves of the ejected gas to produce a sound that may be relatively intense and objectionable to the dog (as compared to a non-radiated and less intense hissing sound of the ejected gas without the horn). The horn 18 may also generate sound waves. The horn 18 may be composed of plastic and may be a one-piece structure that is injection molded. The horn 18 may have a flared bell end 50, and a stem 52 defining a bore 54. The bore 54 may be reamed or otherwise smoothed so that the stem 52 can be press-fit and inserted over the second end 37 of the extension 16 to connect the horn 18 to the extension. In one example, the horn 18 may be the SH3 horn supplied by Falcon Safety Products, Inc. of Branchburg, N.J., USA (www.falconsafety.com).

In use, the animal behavioral control apparatus 10 may optionally and selectively eject a blast of gas at the dog, may emit an objectionable sound at the dog, or may do both. For example, with the horn 18 removed, the trigger 26 may be manually pressed causing the piercing pin of the internal valve to penetrate the cartridge 24 and allow pressurized gas to escape through the head 22, through the nozzle 28, and into the extension 16. The gas travels through the various orifices and the outlet 48 to create a sudden shot of the zone of gas 12. With the horn 18 placed on the extension 16 (if so provided), the ejected gas travels through the horn and produces the objectionable sound. The example cartridge 24 and the various orifices may, in one example, produce 30 blasts of gas, 60 objectionable sounds of one second duration, or a combination thereof. Of course, the animal behavioral control apparatus may be used with other animals besides dogs, including outdoor animals and other household pets such as cats.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. An animal behavioral control apparatus, comprising:
   a cartridge containing pressurized gas;
   a housing surrounding at least part of the cartridge;
   a head connected to the housing, the head including an actuator and a valve, the valve engaging the cartridge upon actuation of the actuator to release gas out of the cartridge and through an outlet port of the head, wherein the head includes a nozzle with an outlet port for ejecting gas out of the head;
   an extension that is a separate and distinct component than the nozzle and that is removably connected to the nozzle at a first end of the extension and that has a bore communicating with the outlet port of the head; and
   a horn removably connected to a second end of the extension, wherein, when the horn is disconnected from the extension, the animal behavioral control apparatus ejects a blast of gas, and when the horn is connected to the extension, the animal behavioral control apparatus emits a sound.

2. The animal behavioral control apparatus of claim 1, further comprising a first O-ring located in the extension and having an orifice to restrict gas flow therethrough.

3. The animal behavioral control apparatus of claim 2, further comprising a second O-ring located in the extension and spaced away from the first O-ring, the second O-ring having an orifice to restrict gas flow therethrough.

4. The animal behavioral control apparatus of claim 3, further comprising a cap connected to the second end of the extension and having an outlet orifice for ejecting gas therethrough.

5. The animal behavioral control apparatus of claim 4, wherein the horn is removably connected over the cap and over a part of the extension.

6. The animal behavioral control apparatus of claim 5, further comprising a third O-ring located between the cartridge and the housing for fitting the cartridge at least partly within the housing.

7. An animal behavioral control apparatus, comprising:
a housing;
a cartridge containing pressurized gas and being received at least partly within the housing;
a head extending from the housing, the head including an actuator and a valve, the valve interacting with the cartridge to selectively release gas out of the cartridge;
a nozzle connected to the head and having an outlet port;
an extension connected to the nozzle, the extension having a first end inserted into the outlet port of the nozzle, the extension having a second end located opposite the first end, the extension having a bore extending between the first end and the second end;
an O-ring located in the extension and having an orifice to restrict gas flow therethrough;
a cap inserted into the second end of the extension and having an outlet orifice for ejecting gas therethrough; and
a horn removably connected over the cap wherein, when the horn is disconnected from the cap, the animal behavioral control apparatus ejects a blast of gas, and when the horn is connected over the cap, the animal behavioral control apparatus emits a sound.

8. The animal behavioral control apparatus of claim 7, further comprising a second O-ring located in the extension and spaced away from the first O-ring, the second O-ring having an orifice to restrict gas flow therethrough.

9. The animal behavioral control apparatus of claim 8, further comprising a third O-ring located between the cartridge and the housing for fitting the cartridge at least partly within the housing.

* * * * *